United States Patent
Koskinen et al.

(10) Patent No.: US 9,565,591 B2
(45) Date of Patent: Feb. 7, 2017

(54) CONGESTION CONTROL ON A CELLULAR FREQUENCY PROVIDING BROADCAST SERVICES

(75) Inventors: Henri Markus Koskinen, Espoo (FI); Benoist Pierre Sebire, Tokyo (JP); Woonhee Hwang, Espoo (FI); Jarkko T. Koskela, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 152 days.

(21) Appl. No.: 14/399,328

(22) PCT Filed: May 15, 2012

(86) PCT No.: PCT/EP2012/058977
§ 371 (c)(1),
(2), (4) Date: Nov. 6, 2014

(87) PCT Pub. No.: WO2013/170881
PCT Pub. Date: Nov. 21, 2013

(65) Prior Publication Data
US 2015/0103650 A1    Apr. 16, 2015

(51) Int. Cl.
*H04W 28/02*    (2009.01)
*H04W 48/06*    (2009.01)
(Continued)

(52) U.S. Cl.
CPC ........ *H04W 28/0289* (2013.01); *H04L 12/189* (2013.01); *H04W 4/06* (2013.01);
(Continued)

(58) Field of Classification Search
CPC .... H04W 28/02; H04W 28/0289; H04W 4/06; H04W 68/02; H04W 36/22; H04L 12/189
See application file for complete search history.

(56) References Cited

U.S. PATENT DOCUMENTS

| | | | | |
|---|---|---|---|---|
| 2009/0316603 A1* | 12/2009 | Amerga | ................ | H04W 48/08 370/254 |
| 2011/0103288 A1 | 5/2011 | Lee et al. | ...................... | 370/312 |
| 2012/0294220 A1* | 11/2012 | Gou | ...................... | H04W 36/00 370/312 |

OTHER PUBLICATIONS

3GPP TS 36.331 V10.5.0 (Mar. 2012); 3rd Generation Partnership Project; Technical Specification Group Radio Access Network; Evolved Universal Teriestrial Radio Access (E-UTRA); Radio Resource Control (RRC); Protocol specification (Release 10), (302 pages).

(Continued)

*Primary Examiner* — Paul H Masur
(74) *Attorney, Agent, or Firm* — Harrington & Smith

(57) ABSTRACT

There are provided measures for congestion control on a cellular frequency providing broadcast services. Such measures exemplarily include removing an entry of a first system information block from a list included in a second system information block to be broadcasted, said first system information block including information related to multimedia broadcast and multicast services, said list including information related to broadcasted system information elements; prohibiting modification of an information tag included in said second system information block to be broadcasted, said information tag being indicative of a change of system information including at least said list; and prohibiting inclusion of a modification indicator in any paging messages to be transmitted, said modification indicator being indicative of said change of said system information.

20 Claims, 6 Drawing Sheets

(51) Int. Cl.
*H04L 12/18* (2006.01)
*H04W 4/06* (2009.01)
*H04W 68/02* (2009.01)
*H04W 48/12* (2009.01)

(52) U.S. Cl.
CPC ............ *H04W 48/06* (2013.01); *H04W 28/02* (2013.01); *H04W 48/12* (2013.01); *H04W 68/02* (2013.01)

(56) References Cited

OTHER PUBLICATIONS

3GPP TSG-RAN2#77 bis meeting TDOC R2-121673 Jeju, South Korea, Mar. 26-30, 2012; Samsung; MBMS congestion handling, (7 pages).

3GPP TSG-RAN WG2 Meeting #77bis R2-121900 Jeju, Korea, Mar. 26-30, 2012 Huawei; Introduction of service continuity improvements for MBMS on LTE, (7 pages).

3GPP TS 36.331 V10.5.0 (Mar. 2012); 3rd Generation Partnership Project; Technical Specification Group Radio Access Network; Evolved Universal Terrestrial Radio Access (E-UTRA); Radio Resource Control (RRC); Protocol specification (Release 10).

3GPP TSG-RAN2#77 bis meeting TDoc R2-121673 Jeju, South Korea, Mar. 26-30, 2012; Samsung; MBMS congestion handling.

3GPP TSG-RAN WG2 Meeting #77bis R2-121900 Jeju, Korea, Mar. 26-30, 2012 Huawei; Introduction of service continuity improvements for MBMS on LTE.

CATT; "Prevention of UE's connection establishment on congested MBMS freq"; R2-116025; 3GPP TSG RAN WG2 Meeting #76, San Francisco, USA; Nov. 14-18, 2011; whole document (2 pages).

LG Electronics; "SIB13 Change for LTE MBMS"; R2-096873; 3GPP TSG-RAN WG2 #68, Jeju, South Korea; Nov. 9-13, 2009; whole document (4 pages).

Ericsson et al.; "MBMS autonomous frequency prioritization in idle mode"; R2-116194; 3GPP TSG-RAN WG2 #76, San Francisco, USA; Nov. 10-14, 2011; whole document (3 pages).

Huawei; "WI update: Service continuity improvements for MBMS for LTE"; RP-120258; TSG-RAN Meeting 55, Xiamen, China; Feb. 28-Mar. 2, 2012; whole document (11 pages).

* cited by examiner

US 9,565,591 B2

CONGESTION CONTROL ON A CELLULAR FREQUENCY PROVIDING BROADCAST SERVICES

FIELD

The present invention relates to congestion control on a cellular frequency providing broadcast services. More specifically, the present invention exemplarily relates to measures (including methods, apparatuses and computer program products) for realizing congestion control on a cellular frequency providing broadcast services.

BACKGROUND

The present specification generally relates to congestion of a cell on a multimedia broadcast and multicast service (MBMS) carrier and the control thereof. MBMS aims to provide an efficient mode of delivery for both broadcast and multicast services over the core network in Long Term Evolution (LTE) systems.

MBMS in LTE Rel-10 systems is only optimized for single-carrier deployments. This means that for terminals in RRC_Idle state, cell reselection rules implement no exceptions for the terminals' possible MBMS reception from a certain frequency or for possible interest in what MBMS services are available on another frequency. Further, for terminals in RRC_Connected state, the network has no knowledge of the terminals' possible MBMS reception from a certain frequency or possible interest in what MBMS services are available on another frequency (so that interfrequency handover decisions could be made accordingly). As a result, an interruption of terminals' possible MBMS reception from a certain frequency may occur on certain incidents like cell reselection.

The ongoing Rel-11 MBMS work item [RP-120258] is set to overcome such inconvenience. As part of this work, the following agreements were minuted:

A new system information block (SIB) is to be used for transmission of (MBMS) service area identity (SAI) information. The new SIB acquisition is to be performed similar to system information block type 13 (SIB13) acquisition procedure. In SIBs, system information (SI) is broadcasted. SI consists of cell- and network-specific parameters which are broadcast to allow terminals like user equipment (UE) to connect successfully to the network. SI is structured into SIBs, each of which contains a set of functionally-related parameters. SIB13 is the existing system-information block dedicated to MBMS, i.e. SIB13 contains necessary information for the UE to start receiving the MBMS broadcast.

When MBMS SAIs are not provided in SI, the UE only prioritizes a frequency where SIB13 is provided, that is, where SIB13 is scheduled in SIB1 (which contains parameters needed to determine if a cell is suitable for cell selection as well as information about the time domain scheduling of the other SIBs). Whether SIB13 is scheduled in SIB1 has to be verified as part of the suitability check before camping on the considered cell. This UE behavior applies to Rel-9/10/11 UEs.

In the RAN2 discussion a concern with the above specification change is the possible concentration of load from unicast-connection establishments onto the cells of a frequency carrier providing MBMS services.

Thereby, a control of congestion and admission are discussed. In particular, a network controlled prioritization of MBMS carrier in case of RRC_Idle mode cell selection, and the question, where to camp when cell on MBMS carrier is congested, and whether an additional indicator for a congested cell is necessary, is discussed.

In the course of the discussion, possible solutions proposed include, for example:

Network indicates whether a frequency may be prioritized for MBMS (if a frequency is not indicated as being prioritizable, a UE may receive MBMS on that frequency but may not camp on it).

A congested MBMS cell may broadcast an indication that UEs prioritizing MBMS over unicast must not establish a connection for Mobile-Originated (MO) data.

UE may prioritize MBMS bearers. Network indicates if it is congested, so that the UE knows that e.g. GBR bearers might not be established.

After discussion of the issues whether a necessity of introducing an additional mechanism to avoid unequal camping load distribution resulted by MBMS prioritization of LTE Rel-11+ UEs exists, and the justification thereof considering that LTE Rel-9/10 UEs are allowed to prioritize the frequency unconditionally and that the problematic basic MBMS UEs would most likely be based on LTE Rel-9/10 (in this respect, more advanced UEs are UEs that are able to receive MBMS while camping on a non-MBMS carrier), main points to be avoided in case the MBMS carrier is congested (and that can not be achieved using existing means) are identified as being dedicated bearers and/or guaranteed bit rate (GBR) bearers (level 1 of avoidance), and connection establishment, signaling and default bearers (level 2 of avoidance).

As a result of the discussion, it is agreed that it is to be relied on existing mechanisms, e.g. allowing MBMS-based prioritization and use of Access-Class Barring (ACB), rejection of RRC Connection Requests, etc., if needed.

That is, as a solution of the above identified problem, relying on existing mechanisms, e.g. allowing MBMS-based prioritization and use of ACB, rejection of RRC Connection Request, etc., if needed, is proposed.

Hence, the problem arises that the possible concentration of load from unicast-connection establishments onto the cells of a frequency carrier providing MBMS services and the thus induced congestion of cells of a frequency carrier providing MBMS services is merely roughly solved.

Hence, there is a need to provide for congestion control on a cellular frequency providing broadcast services.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising removing an entry of a first system information block from a list included in a second system information block to be broadcasted, said first system information block comprising information related to multimedia broadcast and multicast services, said list comprising information related to broadcasted system information elements, prohibiting modification of an information tag included in said second system information block to be broadcasted, said information tag being indicative of a change of system information comprising at least said list, and prohibiting inclusion of a modification indicator in any paging messages that may be transmitted, said modification indicator being indicative of said change of said system information.

According to an exemplary aspect of the present invention, there is provided a method comprising prioritizing, in cell reselection, a carrier frequency providing multimedia broadcast and multicast service, receiving a first system information block comprising at least a list and an information tag, said list comprising information related to broadcasted system information elements, observing a disappearance of an entry of a second system information block from said list, said second system information block comprising information related to multimedia broadcast and multicast services, observing a modification state of said information tag, and continuing said prioritizing, if said information tag is unmodified.

According to an exemplary aspect of the present invention, there is provided an apparatus comprising a control module configured to remove an entry of a first system information block from a list included in a second system information block to be broadcasted, said first system information block comprising information related to multimedia broadcast and multicast services, said list comprising information related to broadcasted system information elements, and a prohibition module configured to prohibit modification of an information tag included in said second system information block to be broadcasted, said information tag being indicative of a change of system information comprising at least said list, and to prohibit inclusion of a modification indicator in any paging messages that may be transmitted, said modification indicator being indicative of said change of said system information.

According to an exemplary aspect of the present invention, there is provided an apparatus comprising a connection controller configured to prioritize, in cell reselection, a carrier frequency providing multimedia broadcast and multicast service, and to receive a first system information block comprising at least a list and an information tag, said list comprising information related to broadcasted system information elements, and a control module configured to observe a disappearance of an entry of a second system information block from said list, said second system information block comprising information related to multimedia broadcast and multicast services, and to observe a modification state of said information tag, wherein said connection controller is further configured to continue said prioritizing, if said information tag is unmodified.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient gradual control of congestion caused by a concentration of terminals on a cellular frequency providing broadcast services.

By way of exemplary embodiments of the present invention, there is provided congestion control on a cellular frequency providing broadcast services. More specifically, by way of exemplary embodiments of the present invention, there are provided measures and mechanisms for realizing congestion control on a cellular frequency providing broadcast services.

Thus, improvement is achieved by methods, apparatuses and computer program products enabling/realizing congestion control on a cellular frequency providing broadcast services.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
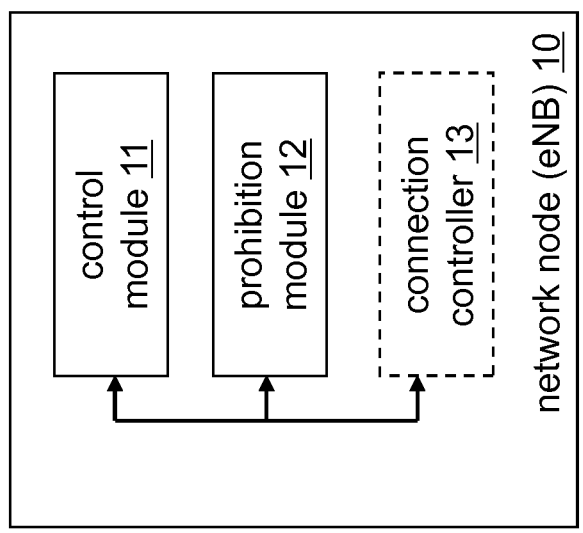
FIG. 1 is a block diagram illustrating an apparatus according to exemplary embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, LTE or LTE-Advanced (LTE-A) is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

In particular, the present invention and its embodiments may be applicable in any carrier based network compound in which a cell (re-)selection is based on a prioritization of the corresponding frequencies, and broadcast and/or multicast data is transmitted.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) congestion control on a cellular frequency providing broadcast services.

Despite the recent agreement not to introduce any dedicated mechanism for MBMS congestion control, the agreement itself allows a crude network-implementation method for such control:

By stopping the broadcasting of the new SIB containing SAIs as well as the SIB13, the network can stop UEs in RRC_Idle prioritizing the MBMS frequency.

However, in many cases it may be overkill and thus inappropriate to force UEs already prioritizing the MBMS-providing carrier to leave that carrier, at least in view of the result the user experiences, namely an interrupted MBMS reception.

Instead, it can be sufficient to prevent further UEs from prioritizing the (congested) MBMS carrier.

It is worth noting that, regardless of the RRC state of the UE, once it has acquired SIB13, it can well keep on receiving MBMS based on the MBMS control channel (MCCH) without any need to regularly re-acquire SIB13, since SIB13 in this case only serves for delivering the necessary parameters to start receiving MCCH by the UE.

Consequently, according to exemplary embodiments of the present invention, a more refined congestion-control method can be achieved by specifying the following two items:

Firstly, a presently RAN2-discussed formulation "If the UE has knowledge on which frequency an MBMS service of interest is provided, it may consider that frequency to be the highest priority during the MBMS session as long as it reselects cells broadcasting SIB13" is to be replaced by a formulation "If the UE has knowledge on which frequency an MBMS service of interest is provided, it may consider that frequency to be the highest priority during the MBMS session as long as it reselects cells which, at the time of reselecting broadcasts SIB13". Namely, the term "at the time of reselecting" is to be added.

Secondly, it is to be specified that "if the UE discovers as a result of changed systemInfoValueTag or systemInfoModification within the paging message the disappearance of SIB13, the UE shall not continue to consider this frequency to be highest priority".

Consequently, if the removal of SIB13 is noticed by a UE but not in conjunction with one of the two conditions stated above, consideration of the respective frequency (by the UE) to be highest priority is still allowed.

As another consequence, in case removal of SIB13 is not noticed by the UE, a consideration of the respective frequency does not need to be precluded by the UE, but will have to be at the time of the next application by the network, of the two conditions stated above.

Hence, according to exemplary embodiments of the present invention, a silent removal of SIB13 in case of congestion is proposed, which allows UEs already prioritizing the MBMS carrier to remain and keep receiving MBMS services.

In this context, removal refers to stop indicating SIB13 as being broadcast in SchedulingInfoList of SIB1. This may be done together with either
actually stopping broadcasting SIB13, or
leaving the broadcast of SIB13.

Further in this context, silent means without applying either of the regular system-information change notification mechanisms, which comprise including systemInfoModification within the paging message, and changing the value of systemInfoValueTag. Thereby, systemInfoModification is indicative of a BCCH modification other than SIB10 and SIB11 and is transmitted via a paging message to a UE. Further, systemInfoValueTag is contained in the periodically broadcasted SIB1 and indicative of any modification of the SIs.

It is to be noted that the possibility of removing SIB13 together with a notification via the regular system-information change notification mechanisms (systemInfoModification, systemInfoValueTag) is maintained. In such case all UEs would have to stop prioritizing the MBMS carrier.

In the following, exemplary embodiments of the present invention implementing the proposed milder, gradual congestion control (requiring the above mentioned specification changes) are described.

FIG. 1 is a block diagram illustrating an apparatus according to exemplary embodiments of the present invention.

As shown in FIG. 1, according to exemplary embodiments of the present invention, the apparatus is a network node 10 comprising a control module 11 and a prohibition module 12. The control module 11 removes an entry of a first system information block from a list. At that, said first system information block comprises information related to multimedia broadcast and multicast services, said list comprises information related to broadcasted system information elements and said list being broadcast in a second system information block. The prohibition module 12 prohibits modification of an information tag included in the second system information block to be broadcasted. At that, said information tag is indicative of a change of system information comprising at least said list. Further, the prohibition module 12 prohibits inclusion of a modification indicator into any paging messages that may be transmitted. At that, said modification indicator is indicative of said change of said system information. The steps of prohibiting by the prohibition module are preceded by an initial verification by the control module, that no other changes to system information at the next upcoming system-information modification-period boundary require changing the information tag included in the second system information block, or including a modification indicator into a paging message to be transmitted during the ongoing system-information modification period.

In other words, the apparatus (e.g. an evolved NodeB (eNB)) is, by use of the control module and the prohibition module configured to remove the SIB13 announcement (i.e. the first system information block) silently. Namely, the regular system-information change notification mechanisms, that is the systemInfoValueTag (i.e. the information tag) contained in the periodically broadcasted SIB1 (i.e. the second system information block) and the systemInfoModification (i.e. the modification indicator) within the paging message, are not applied, that is, they are prohibited.

Hence, according to exemplary embodiments of the present invention, established MBMS connections are not interrupted, since the established UEs are not informed of the removed SIB13 announcement using the regular system-information change notification mechanisms that are now suppressed.

According to further exemplary embodiments of the present invention, the apparatus may further comprise a connection controller 13. The connection controller 13 stops broadcasting the first system information block. Alternatively, the connection controller 13 continues broadcasting the first system information block. Understandably, it is assumed that the first system information block, i.e. the SIB13 is broadcasted so far.

In other words, after stopping indication of SIB13 as being broadcast in SchedulingInfoList of SIB1 (i.e. the list of the second system information block), broadcasting of SIB13 may be actually stopped, or broadcasting of SIB13 may be maintained.

According to still further exemplary embodiments of the present invention, the control module 11 removes an entry of a third system information block from said list. At that, said third system information block comprises service area identity information, and corresponds to the proposed new SIB comprising SAIs. Further, the connection controller 13 stops broadcasting of said third system information block. The control module 11 modifies said information tag, and includes said modification indicator into said paging message to be transmitted. In other words, the new SIB is stopped from broadcasting, the entry thereof is removed from the SchedulingInfoList of SIB1, the systemInfoValueTag (to be broadcasted via the SIB1) is modified and the systemInfoModification indicator is included in a paging message to be transmitted to a UE. Hence, the regular system-information change notification mechanisms are applied in the context of the new SIB, and a UE can notice the disappearance of the new SIB.

It is to be noted that said removing the entry of said third system information block, said stopping broadcast of the third system information block, said modifying the information tag and said including the modification indicator are performed prior to said removing said entry of said first system information block. In particular, said removing said entry of said first system information block, said prohibition of modification of the information tag included in the second system information block to be broadcasted, and said prohibition of inclusion of the modification indicator into the paging message to be transmitted (i.e. the above mentioned measures regarding SIB13) are performed at a system-information modification period boundary (i.e. a boundary between two system-information modification periods) following the completion of the measures regarding the new SIB.

According to still further embodiments of the present invention, the connection controller 13 may broadcast the second system information block comprising said list and said information tag prior to said removing said entry of said first system information block and may transmit the paging message prior to said removing said entry of said first system information block. That is, as a completion of the regular system-information change notification mechanisms related to the new SIB, the SIB1 comprising an updated SchedulingInfoList and the modified systemInfoValueTag and the paging message comprising the systemInfoModification may be broadcasted and transmitted, respectively. In particular, the above mentioned measures regarding SIB13 are performed at a system-information modification period boundary also following this broadcasting/transmitting.

According to still further embodiments of the present invention, the connection controller 13 broadcasts the second system information block (i.e. SIB1) comprising the list and said information tag, wherein the information tag is prevented from being modified in the context of SIB13.

According to still further embodiments of the present invention, the connection controller may transmit a paging message, wherein a modification indicator is prevented from being included in the paging message in the context of SIB13.

It is to be noted that the measures regarding the new SIB described in connection with FIG. 1 are not performed by LTE Rel-9/10 eNBs, but may only be performed by LTE Rel-11+ eNBs. It is further to be noted that the measures regarding the new SIB are described in connection with FIG. 1 only in order to match the above stated agreements.

Figure 2:
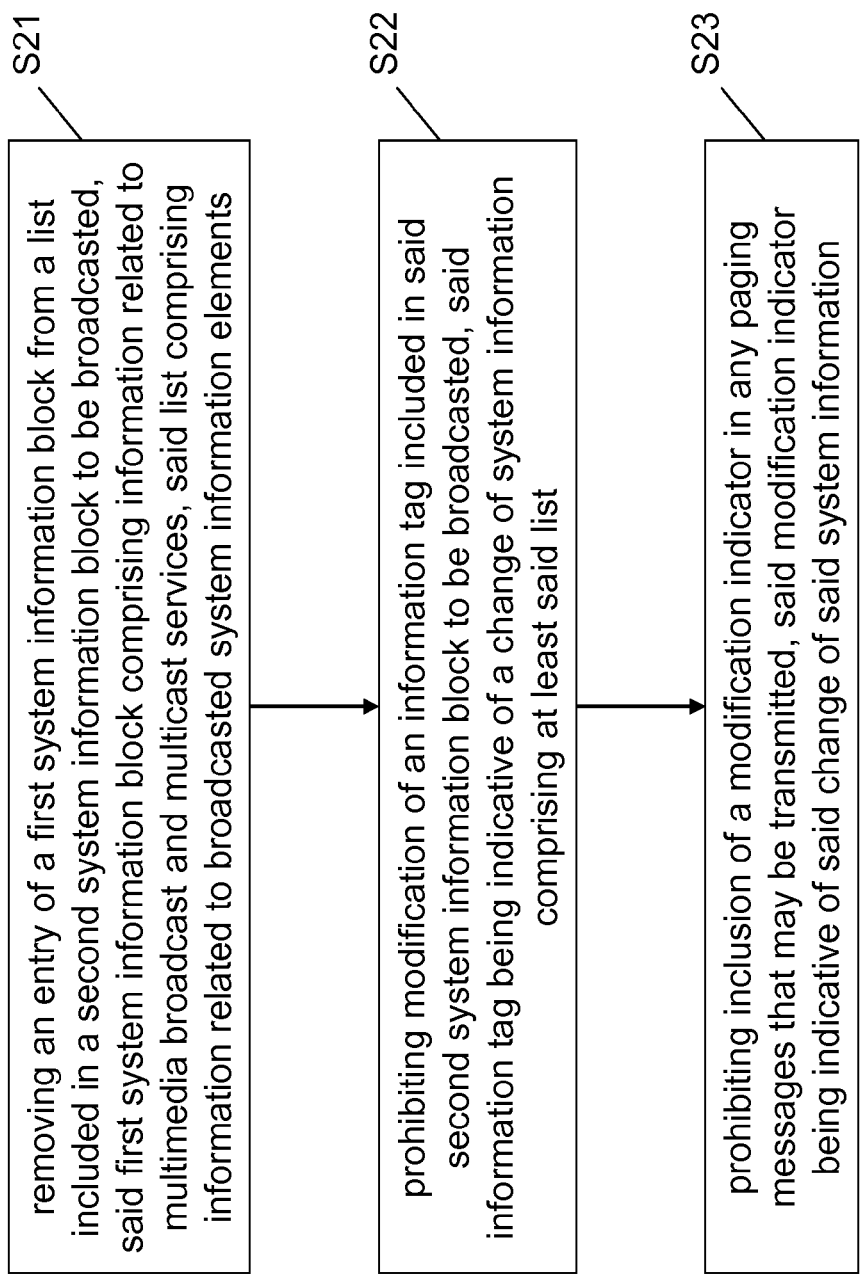
FIG. 2 is a schematic diagram of a procedure according to exemplary embodiments of the present invention.

FIG. 2 is a schematic diagram of a procedure according to exemplary embodiments of the present invention.

As shown in FIG. 2, a procedure according to exemplary embodiments of the present invention comprises an operation of removing an entry of a first system information block from a list, said first system information block comprising information related to multimedia broadcast and multicast services, said list comprising information related to broadcasted system information elements, said list being broadcast in a second system information block, an operation of prohibiting modification of an information tag included in the second system information block to be broadcasted, said information tag being indicative of a change of system information comprising at least said list, and an operation of prohibiting inclusion of a modification indicator into any paging message that may be transmitted, said modification indicator being indicative of said change of said system information. The procedure is preceded by an initial verification that no other changes to system information at the next upcoming system-information modification-period boundary require changing the information tag included in the second system information block, or including a modification indicator into a paging message to be transmitted during the ongoing system-information modification period.

According to a variation of the procedure shown in FIG. 2, exemplary additional operations are given, which are inherently independent from each other as such. According to such variation, an exemplary method according to exemplary embodiments of the present invention may comprise an operation of stopping broadcast of said first system information block, or an operation of continuing broadcast of said first system information block.

According to a further variation of the procedure shown in FIG. 2, exemplary additional operations are given, which are inherently independent from each other as such. According to such variation, an exemplary method according to exemplary embodiments of the present invention may comprise an operation of removing an entry of a third system information block from said list, said third system information block comprising service area identity information, an operation of stopping broadcast of said third system information block, an operation of modifying said information tag, and an operation of including said modification indicator into said paging message to be transmitted.

It is to be noted that, in such case, said removing said entry of said third system information block, said stopping broadcast of said third system information block, said modifying said information tag and said including said modification indicator are performed prior to said removing said entry of said first system information block. In particular, the above mentioned measures regarding the first system information block are performed at a system-information modification period boundary (i.e. a boundary between two system-information modification periods) following the completion of the measures regarding the third system information block.

According to a further variation of the procedure shown in FIG. 2, exemplary additional operations are given, which are inherently independent from each other as such. According to such variation, an exemplary method according to exemplary embodiments of the present invention may comprise an operation of broadcasting said second system information block comprising said list and said information tag prior to said removing said entry of said first system information block (as a measure regarding the third system information block); and/or an operation of transmitting said paging message prior to said removing said entry of said first system information block (as a measure regarding the third system information block).

Figure 3:
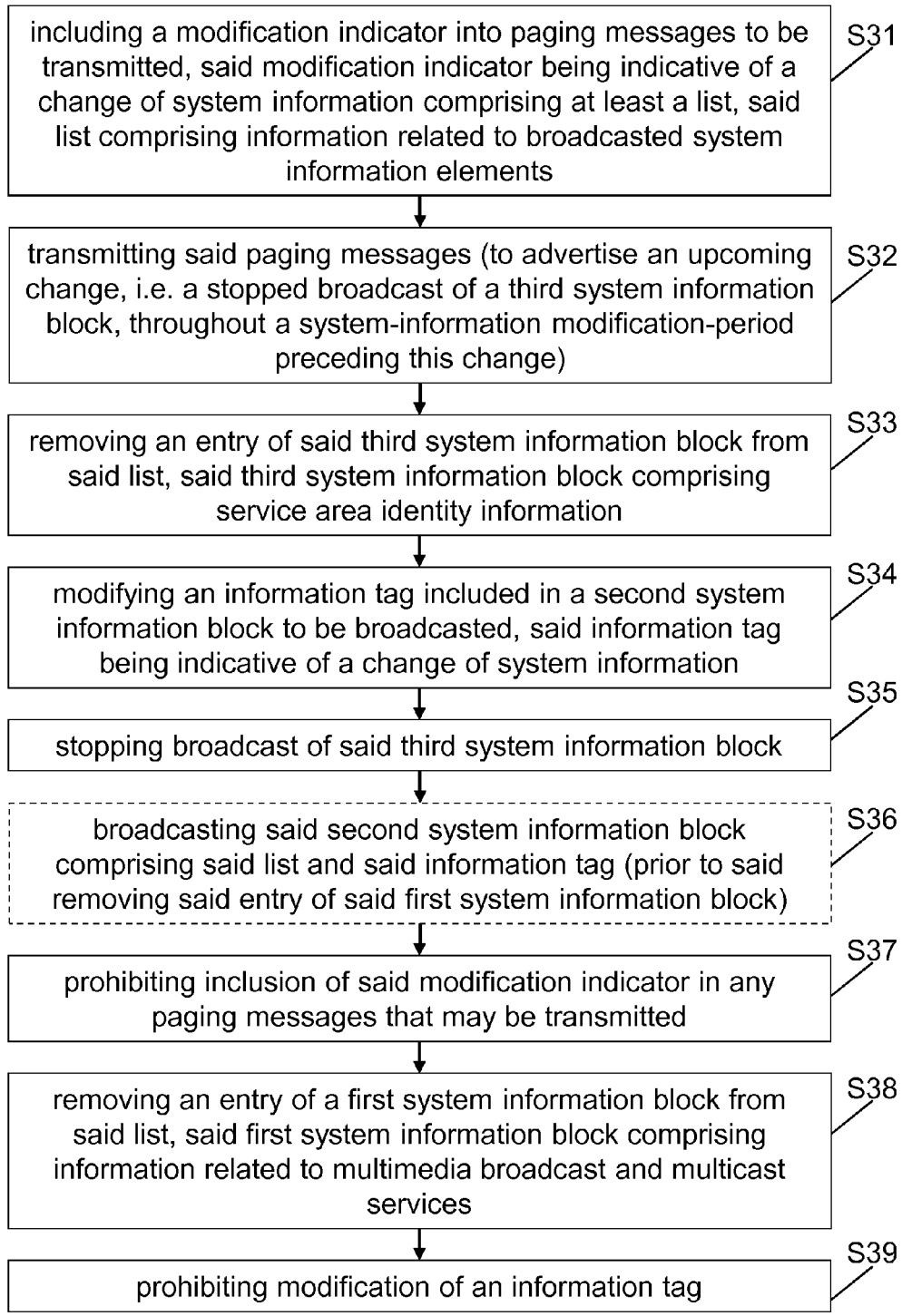
FIG. 3 is a schematic diagram of a procedure according to exemplary embodiments of the present invention.

FIG. 3 is a schematic diagram of a procedure according to exemplary embodiments of the present invention.

In particular, in FIG. 3 a procedure comprising selected steps according to exemplary embodiments of the present invention as described with respect to FIG. 2 is depicted in order to further emphasize the order of the respective steps.

As shown in FIG. 3, a procedure according to exemplary embodiments of the present invention comprises an operation of including a modification indicator into paging messages to be transmitted, said modification indicator being indicative of a change of system information comprising at least a list, said list comprising information related to broadcasted system information elements, an operation of transmitting said paging messages (to advertise an upcoming change, i.e. a stopped broadcast of a third system information block, throughout a system-information modification-period preceding this change), an operation of removing an entry of said third system information block from said list, said third system information block comprising service area identity information, an operation of modifying an information tag included in a second system information block to be broadcasted, said information tag being indicative of a change of system information, and an operation of stopping broadcast of said third system information block (as a measure regarding the third system information block). The procedure may optionally comprise an operation of broadcasting said second system information block comprising said list and said information tag (prior to said removing said entry of said first system information block) as an additional measure regarding the third system information block.

The procedure further comprises an operation of prohibiting inclusion of said modification indicator in any paging messages that may be transmitted, an operation of removing an entry of a first system information block from said list, said first system information block comprising information related to multimedia broadcast and multicast services, and an operation of prohibiting modification of an information tag (as a measure regarding the first system information block).

That is, as a first couple of steps as measures regarding the third system information block, the new SIB for broadcasting SAIs is removed, if it has been broadcasted by then. This includes paging a modification indicator, i.e. a systemInfoModification, which is performed throughout a system-information modification-period preceding this removal. At the system-information modification-period border, the entry of the new SIB is removed from the SchedulingInfoList, the systemInfoValueTag is modified, and the broadcast of the new SIB is actually stopped.

Further, as a second couple of steps as measures regarding the first system information block, the SIB13 is silently removed, that is, an inclusion of a systemInfoModification into paging messages that may be transmitted is prohibited as well as a modification of the systemInfoValueTag. In addition, the entry of the SIB13 is deleted from the SchedulingInfoList.

Subsequently, the second system information block (i.e. SIB1 prevented from a modified information tag) may be broadcasted, and/or a paging message (without a modification indicator) may be transmitted to a UE.

Figure 4:
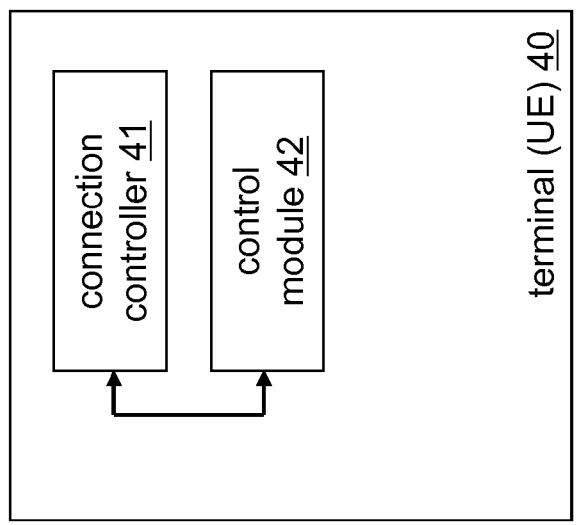
FIG. 4 is a block diagram illustrating an apparatus according to exemplary embodiments of the present invention.

FIG. 4 is a block diagram illustrating an apparatus according to exemplary embodiments of the present invention.

As shown in FIG. 4, according to exemplary embodiments of the present invention, the apparatus is a terminal 40 comprising a connection controller 41 and a control module 42. The connection controller 41 prioritizes, in cell reselection, a carrier frequency providing multimedia broadcast and multicast service, said carrier being identified as broadcasting information related to broadcasted system information elements in a first system information block. Further, the connection controller 42 receives a first system information block comprising at least a list and an information tag. At that, said list comprises information related to broadcasted system information elements. The control module 42 observes a disappearance of an entry of a second system information block from said list. At that, said second system information block comprises information related to multimedia broadcast and multicast services. Further, the control module 42 observes a modification state of said information tag. If the information tag is unmodified, the connection controller 41 continues the prioritizing.

According to further exemplary embodiments of the present invention, the connection controller 41 may further receive a paging message. If the paging message does not contain a predetermined modification indicator, the connection controller 41 continues the prioritizing.

It is to be noted that the apparatus 40 may be operable as or at a terminal, user equipment, mobile station or modem, and/or in at least one of a LTE and a LTE-A cellular system. Further, the first system information block may be a SIB Type 1. Still further, the list may be a schedulingInfoList. Further, the information tag may be a systemInfoValueTag. In addition, the second system information block may be a SIB Type 13, and the modification indicator may be a systemInfoModification.

Figure 5:
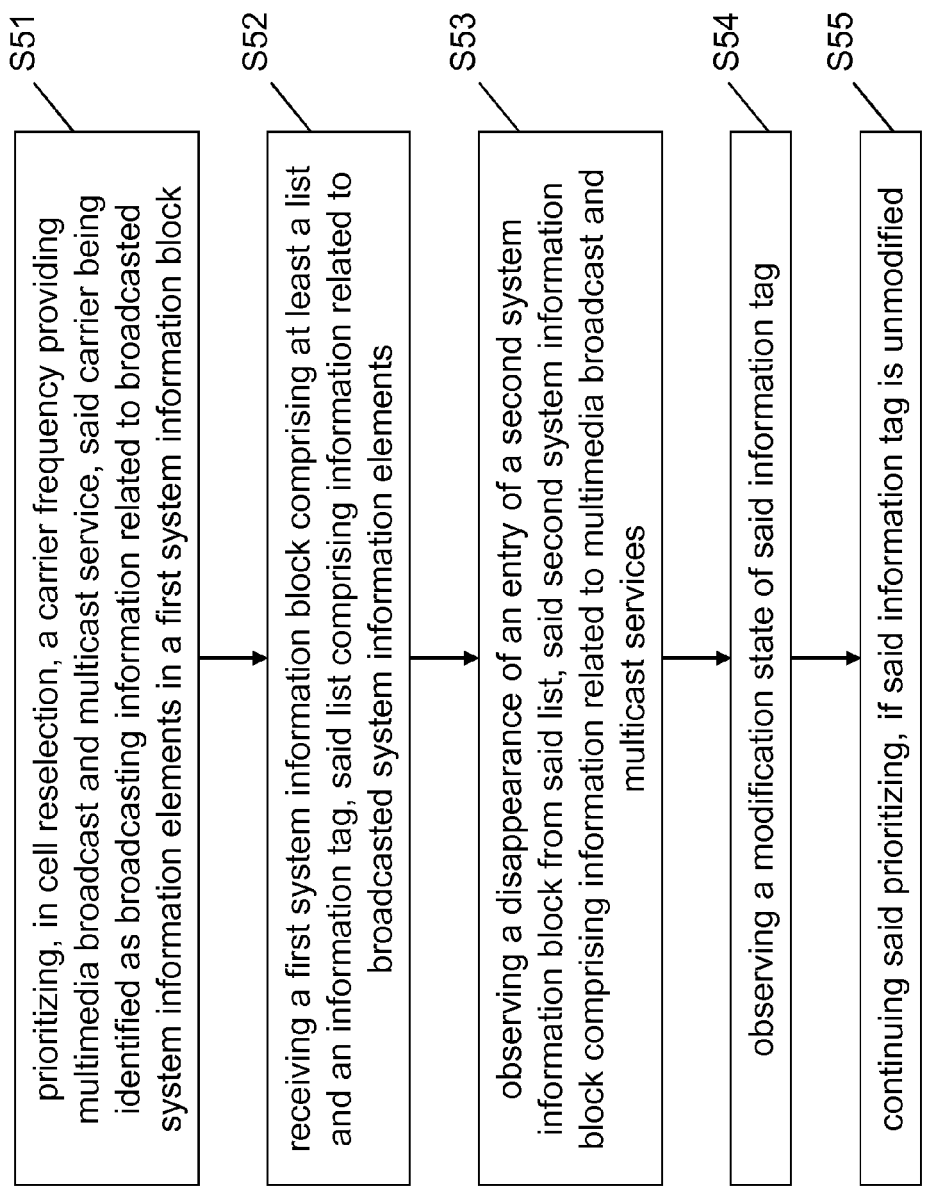
FIG. 5 is a schematic diagram of a procedure according to exemplary embodiments of the present invention.

FIG. 5 is a schematic diagram of a procedure according to exemplary embodiments of the present invention.

As shown in FIG. 5, a procedure according to exemplary embodiments of the present invention comprises an operation of prioritizing, in cell reselection, a carrier frequency providing multimedia broadcast and multicast service, said carrier being identified as broadcasting information related to broadcasted system information elements in a first system information block, an operation of receiving a first system information block comprising at least a list and an information tag, said list comprising information related to broadcasted system information elements, an operation of observing a disappearance of an entry of a second system information block from said list, said second system information block comprising information related to multimedia broadcast and multicast services, an operation of observing a modification state of said information tag and an operation of continuing said prioritizing, if said information tag is unmodified.

According to a variation of the procedure shown in FIG. 5, exemplary additional operations are given, which are inherently independent from each other as such. According to such variation, an exemplary method according to exemplary embodiments of the present invention may comprise an operation of receiving a paging message, and an operation of continuing said prioritizing, if said paging message does not contain a predetermined modification indicator.

According to exemplary embodiments of the present invention, by applying the proposed mild congestion control, ongoing MBMS reception is not interrupted on congestion, such that an improved user experience can be achieved.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network node (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 6:
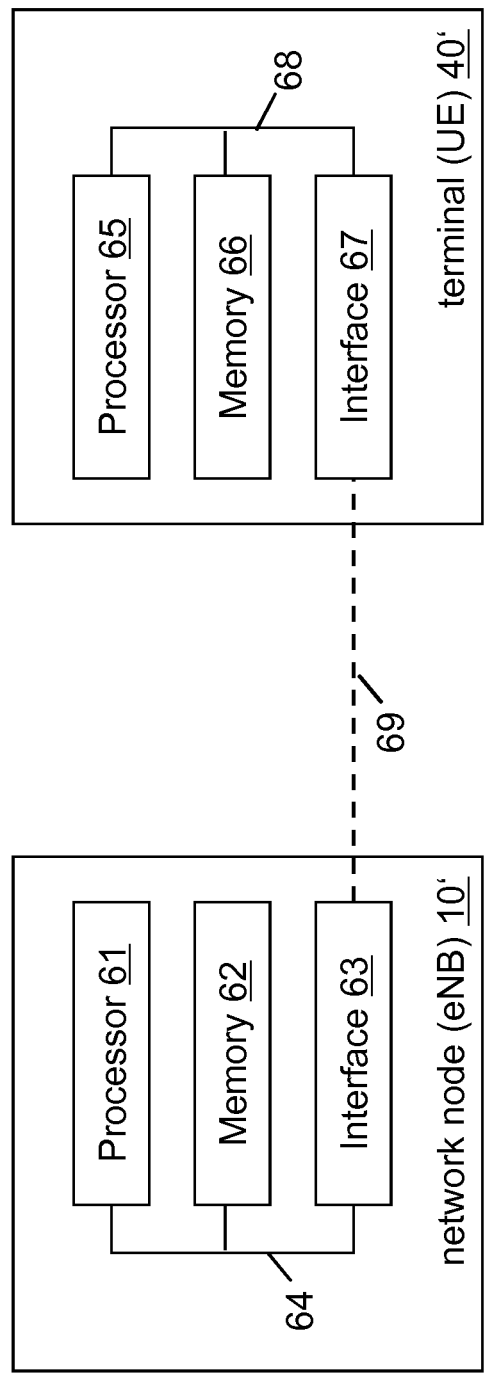
FIG. 6 is a block diagram alternatively illustrating apparatuses according to exemplary embodiments of the present invention.

In FIG. 6, an alternative illustration of apparatuses according to exemplary embodiments of the present invention is depicted. As indicated in FIG. 6, according to exemplary embodiments of the present invention, the apparatus (network node) 10' (corresponding to the network node 10) comprises a processor 61, a memory 62 and an interface 63, which are connected by a bus 64 or the like. Further, according to exemplary embodiments of the present invention, the apparatus (terminal) 40' (corresponding to the terminal 40) comprises a processor 65, a memory 66 and an interface 67, which are connected by a bus 68 or the like, and the apparatuses may be connected via link 69, respectively.

The processor 61/65 and/or the interface 63/67 may also include a modem or the like to facilitate communication over a (hardwire or wireless) link 69, respectively. The interface 63/67 may include a suitable transceiver coupled to one or more antennas or communication means for (hardwire or wireless) communications with the linked or connected device(s), respectively. The interface 63/67 is generally configured to communicate with at least one other apparatus, i.e. the interface thereof.

The memory 62/66 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network node 10' comprises at least one processor 61, at least one memory 62 including computer program code, and at least one interface 63 configured for communication with at least another apparatus. The processor (i.e. the at least one processor 61, with the at least one memory 62 and the computer program code) is configured to perform removing an entry of a first system information block from a list, said first system information block comprising information related to multimedia broadcast and multicast services, said list comprising information related to broadcasted system information elements (thus the apparatus comprising corresponding means for removing), to perform prohibiting modification of an information tag included in a second system information block to be broadcasted, said information tag being indicative of a change of system information comprising at least said list (thus the apparatus comprising corresponding means for prohibiting), and to perform prohibiting inclusion of a modification indicator into any paging message that may be transmitted, said modification indicator being indicative of said change of said system information.

According to exemplary embodiments of the present invention, an apparatus representing the terminal 40' comprises at least one processor 65, at least one memory 66 including computer program code, and at least one interface 67 configured for communication with at least another apparatus. The processor (i.e. the at least one processor 65, with the at least one memory 66 and the computer program code) is configured to perform prioritizing, in cell reselection, a carrier frequency providing multimedia broadcast and multicast service (thus the apparatus comprising corresponding means for prioritizing), to perform receiving a first system information block comprising at least a list and an information tag, said list comprising information related to broadcasted system information elements (thus the apparatus comprising corresponding means for receiving), to perform observing a disappearance of an entry of a second system information block from said list, said second system information block comprising information related to multimedia broadcast and multicast services (thus the apparatus comprising corresponding means for observing), to perform observing a modification state of said information tag, and to perform continuing said prioritizing, if said information tag is unmodified (thus the apparatus comprising corresponding means for continuing).

For further details regarding the operability/functionality of the individual apparatuses, reference is made to the above description in connection with any one of FIGS. 1 to 5, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for congestion control on a cellular frequency providing broadcast services. Such measures exemplarily comprise removing an entry of a first system information block from a list included in a second system information block to be broadcasted, said first system information block comprising information related to multimedia broadcast and multicast services, said list comprising information related to broadcasted system information elements; prohibiting modification of an information tag included in said second system information block to be broadcasted, said information tag being indicative of a change of system information comprising at least said list; and prohibiting inclusion of a modification indicator in any paging messages to be transmitted, said modification indicator being indicative of said change of said system information.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

MBMS multimedia broadcast and multicast service
LTE Long Term Evolution
SIB system information block
SAI service area identity
SIBn system information block type n
SI system information
UE user equipment
GBR guaranteed bit rate
ACB access class barring
MO mobile originated
LTE-A LTE-Advanced
MCCH MBMS control channel
eNB evolved NodeB

The invention claimed is:

1. A method comprising:
removing an entry of a first system information block from a list included in a second system information block to be broadcasted, said first system information block comprising information related to multimedia broadcast and multicast services, said list comprising information related to broadcasted system information elements;
prohibiting modification of an information tag included in said second system information block to be broadcasted, said information tag being indicative of a change of system information comprising at least said list; and
prohibiting inclusion of a modification indicator in any paging messages that may be transmitted, said modification indicator being indicative of said change of said system information.

2. The method according to claim 1, further comprising: stopping broadcast of said first system information block.

3. The method according to claim 1, further comprising: continuing broadcast of said first system information block.

4. The method according to claim 1, further comprising:
removing an entry of a third system information block from said list, said third system information block comprising service area identity information;
stopping broadcast of said third system information block;
modifying said information tag; and
including said modification indicator into said paging messages to be transmitted wherein said removing said entry of said third system information block, said stopping broadcast of said third system information block, said modifying said information tag and said including said modification indicator are performed prior to said removing said entry of said first system information block.

5. The method according to claim 4, further comprising:
at least one of:
broadcasting said second system information block comprising said list and said information tag prior to said removing said entry of said first system information block, and
transmitting said paging messages prior to said removing said entry of said first system information block.

6. The method according to claim 1, wherein at least one of:
the method is operable at or by a base station or access node of a cellular system,
the method is operable in at least one of a LTE and a LTE-A cellular system,
said first system information block is a SIB Type 13,
said second system information block is a SIB Type 1,
said list is a schedulingInfoList,
said information tag is a systemInfoValueTag, and
said modification indicator is a systemInfoModification.

7. A method comprising:
prioritizing, in cell reselection, a carrier frequency providing multimedia broadcast and multicast service;
receiving a first system information block comprising at least a list and an information tag, said list comprising information related to broadcasted system information elements;
observing a disappearance of an entry of a second system information block from said list, said second system information block comprising information related to multimedia broadcast and multicast services;
observing a modification state of said information tag; and
continuing said prioritizing, if said information tag is unmodified.

8. The method according to claim 7, further comprising:
receiving a paging message; and
continuing said prioritizing, if said paging message does not contain a predetermined modification indicator.

9. The method according to claim 7, wherein at least one of:
the method is operable at or by a terminal, user equipment, mobile station or modem,
the method is operable in at least one of a LTE and a LTE-A cellular system,
said first system information block is a SIB Type 1,
said list is a schedulingInfoList,
said information tag is a systemInfoValueTag,
said second system information block is a SIB Type 13, and
said modification indicator is a systemInfoModification.

10. An apparatus comprising:
at least one processor; and
at least one memory including computer program code, where the at least one memory and the computer program code are configured, with the at least one processor, to cause the apparatus to at least:
remove an entry of a first system information block from a list included in a second system information block to be broadcasted, said first system information block comprising information related to multimedia broadcast and multicast services, said list comprising information related to broadcasted system information elements;
prohibit modification of an information tag included in said second system information block to be broadcasted, said information tag being indicative of a change of system information comprising at least said list; and
prohibit inclusion of a modification indicator in any paging messages that may be transmitted, said modification indicator being indicative of said change of said system information.

11. The apparatus according to claim 10,
wherein the at least one memory including the computer program code is configured with the at least one processor to cause the apparatus to stop broadcast of said first system information block.

12. The apparatus according to claim 10,
wherein the at least one memory including the computer program code is configured with the at least one processor to cause the apparatus to continue broadcast of said first system information block.

13. The apparatus according to claim 10, wherein the at least one memory including the computer program code is configured with the at least one processor to cause the apparatus to:
remove an entry of a third system information block from said list, said third system information block comprising service area identity information;
stop broadcast of said third system information block;
modify said information tag; and
include said modification indicator into said paging messages to be transmitted, wherein said removing said entry of said third system information block, said stopping broadcast of said third system information block, said modifying said information tag and said including said modification indicator are performed prior to said removing said entry of said first system information block.

14. The apparatus according to claim 13, wherein the at least one memory including the computer program code is configured with the at least one processor to cause the apparatus to at least one of:
broadcast said second system information block comprising said list and said information tag prior to said removing said entry of said first system information block; and
transmit said paging messages prior to said removing said entry of said first system information block.

15. The apparatus according to claim 10, wherein at least one of:
the apparatus is operable as or at a base station or access node of a cellular system,
the apparatus is operable in at least one of a LTE and a LTE-A cellular system, said first system information block is a SIB Type 13,
said second system information block is a SIB Type 1,
said list is a schedulingInfoList,
said information tag is a systemInfoValueTag, and
said modification indicator is a systemInfoModification.

16. An apparatus comprising:
at least one processor; and
at least one memory including computer program code,
where the at least one memory and the computer program code are configured, with the at least one processor, to cause the apparatus to at least:
prioritize, in cell reselection, a carrier frequency providing multimedia broadcast and multicast service;
receive a first system information block comprising at least a list and an information tag, said list comprising information related to broadcasted system information elements;
observe a disappearance of an entry of a second system information block from said list, said second system information block comprising information related to multimedia broadcast and multicast services; and
observe a modification state of said information tag;
wherein
said apparatus is further configured to continue said prioritizing, if said information tag is unmodified.

17. The apparatus according to claim 16, wherein
the at least one memory including the computer program code is configured with the at least one processor to cause the apparatus to:
receive a paging message; and
continue said prioritizing, if said paging message does not contain a predetermined modification indicator.

18. The apparatus according to claim 16, wherein at least one of:
the apparatus is operable as or at a terminal, user equipment, mobile station or modem,
the apparatus is operable in at least one of a LTE and a LTE-A cellular system,
said first system information block is a SIB Type 1,
said list is a schedulingInfoList,
said information tag is a systemInfoValueTag,
said second system information block is a SIB Type 13, and
said modification indicator is a systemInfoModification.

19. A non-transitory memory storing a computer program product comprising computer-executable computer program code which is executed by a processor, to cause the computer to carry out the method according to claim 1.

20. The computer program product according to claim 19, wherein the computer program code is directly loadable into an internal memory of the processor.

* * * * *